United States Patent [19]
Nakayama et al.

[11] Patent Number: 4,916,537
[45] Date of Patent: Apr. 10, 1990

[54] IMAGE INFORMATION SIGNAL TRANSMITTING SYSTEM

[75] Inventors: Tadayoshi Nakayama; Hisashi Ishikawa, both of Kanagawa; Susumu Kozuki, Tokyo; Koji Takahashi, Kanagawa; Katsuji Yoshimura, Kanagawa; Kenichi Nagasawa, Kanagawa; Tomohiko Sasatani, Kanagawa, all of Japan

[73] Assignee: Canon Kabushiki Kaisha, Tokyo, Japan

[21] Appl. No.: 329,006

[22] Filed: Mar. 27, 1989

[30] Foreign Application Priority Data

Mar. 28, 1988 [JP] Japan .................. 63-071966

[51] Int. Cl.$^4$ .............................. H04N 7/12
[52] U.S. Cl. ...................... 358/133; 358/138
[58] Field of Search ............ 358/133, 135, 138, 137, 358/136, 426; 382/56

[56] References Cited
U.S. PATENT DOCUMENTS 4,703,348  10/1987  Yuasa et al. .............. 358/133
4,755,878   7/1988  Nakayama et al. ........ 358/136
4,797,741   1/1989  Sato et al. ................ 358/138

Primary Examiner—James J. Groody
Assistant Examiner—Victor R. Kostak
Attorney, Agent, or Firm—Robin, Blecker, Daley & Driscoll

[57] ABSTRACT

An image information signal transmitting system according to the present invention is structured in such a manner that an image information signal composed of a plurality of picture element data corresponding to one picture is stored in units of blocks each of which is composed of a predetermined number of picture element data, the image information signal composed of a plurality of picture element data corresponding to one picture is divided into the blocks, and picture element data is extracted from the thus-divided blocks by a number smaller than the number of picture element data forming the block, and the extracted picture element is stored in units of corresponding blocks. Furthermore, the image information signal composed of a plurality of picture element data corresponding to one picture is divided into the blocks, and a transmission mode for the picture element data forming each of the blocks is determined among a plurality of transmission modes having different numbers of picture element data transmitted, a reading address which corresponds to a block determined to be transmitted in a transmission mode having the greatest number of picture element data transmitted, discrimination data for discriminating an address corresponding to an end portion in each horizontal line direction of a picture from other reading addresses is generated, and stored picture element data is read out so that image information signals can be stably transmitted without any deterioration in the image quality.

3 Claims, 8 Drawing Sheets

IMAGE INFORMATION SIGNAL TRANSMITTING SYSTEM

BACKGROUND OF THE INVENTION

1. Field of the Invention

This invention relates to an image information signal transmitting system capable of transmitting image information signals.

2. Description of the Related Art

Hitherto, a time-axis transforming band-compression (abbreviated to "TAT" hereinafter) system in which the fact that whether information is coarse or dense is varied depending upon the positions is utilized has been known as a band compression system capable of transmitting image information. That is, as designated by a dashed line of FIG. 1, an original signal is divided into blocks at intervals of a predetermined period of time, and whether information is coarse or dense is determined in each of the blocks divided at intervals of the predetermined period of time. In the block in which corresponding information is determined to be dense, all of data obtained by sampling the original signal is transmitted in the form of transmitted data, while in the block in which corresponding information is determined to be coarse, a part of data is omitted and only a part of all data is made to be the transmitted data. Referring to this figure, data marked O represents data to be transmitted (transmitted data), while data marked X represents data not to be transmitted (data non-transmitted). The number of data to be transmitted per unit period of time can be decreased by transmitting data marked O at a constant interval so that the transmission signal band can be compressed. In this case, a signal representing whether the original signal is coarse or dense is simultaneously transmitted as transmission mode information. The receiving side determines, in response to the above-described transmission mode information, whether all of the sampled data in the subject block has been received or only a part of the same has been received. As a result of this determination, interpolated data for interpolating the portion from which data has been omitted is formed from the received data. Referring to the figure, the hatched mark O represents the interpolated data.

In a case where the TAT system is applied to image information, a further effective compression can be performed by arranging not only the horizontal sampling interval but also the vertical sampling interval to be variable since image information involves a two dimensional expansion and a correlation in both horizontal and vertical directions (abbreviated to "two dimensional TAT" hereinafter). In such two dimensional TAT, a picture is divided into picture element blocks each of which is formed by m×n picture elements, and the amount of data to be transmitted is changed in each of these picture element blocks. FIGS. 2(a) and 2(b) are views which illustrate patterns of picture elements to be transmitted. Referring to FIGS. 2(a) and 2(b), the picture element block is formed by 4×4 picture elements. FIG. 2(a) is a view which illustrates the picture elements to be transmitted corresponding to a mode (called a "mode E" hereinafter) arranged to transmit all picture element data. FIG. 2(b) is a view which illustrates the picture elements to be transmitted in a mode (called a "mode C" hereinafter) arranged to transmit only a part of all picture element data. Referring to this figure, mark O represents the picture elements to be transmitted, while mark X represents the picture elements not to be transmitted. Furthermore, as can be clearly seen from FIGS. 2(a) and 2(b), the density of information transmitted in the mode C is a quarter of that realized in the mode E.

Each of a plurality of blocks obtained by dividing one picture is provided with a corresponding transmission mode so as to arrange the ratio of the number of blocks to be transmitted in the mode E to that in the mode C to be constant. Then, data is successively transmitted starting from, for example, the left and upper side to the right and lower side of a picture. As a result, the compression rate of a picture is made uniform.

The picture elements of the picture element block in the transmission mode C which are not transmitted are restored by interpolated picture element data formed on the receiving side on the basis of the transmitted picture element data.

However, the above-described transmitting system is structured in such a manner that blocks of two transmission modes each having a different amount of information to be transmitted are present together in a picture, and the transmission mode of the information is determined by transmission mode information which is individually transmitted in a frequency multiplex manner or the like. Therefore, a problem arises in that a correct image cannot be restored if an error or a lack of transmission mode information is generated during the transmission.

In this transmitting system, each image information is arranged to be transmitted in units of blocks. Therefore, a problem arises in that if a time-axis variation is generated in the block due to, for example, a jitter, this variation would have an influence on the picture in units of blocks, causing an extremely remarkable partial picture distortion. Furthermore, since noncontinuous portions would be periodically generated in the case of the block transmission, noise is apt to be generated, such noise causing an inevitable effect upon the other devices and a deterioration in the image quality of the reproduced image.

SUMMARY OF THE INVENTION

An object of the present invention is to provide an image information signal transmitting system capable of overcoming the above-described problems.

Another object of the present invention is to provide an image information signal transmitting system capable of stably transmitting the image information signal without involving any image quality deterioration with a simple structure.

In order to achieve the above-described problems, an image information signal transmitting system according to the present invention comprises: first storage means for storing an image information signal composed of a plurality of picture element data corresponding to one picture in units of blocks each of which is composed of a predetermined number of picture element data; extracting means for dividing the image information signal composed of a plurality of picture element data corresponding to one picture into the blocks, extracting from each of the blocks a smaller number of picture element data than the number of picture element data of which each of the blocks is composed, and outputting the extracted picture element data; second storage means for storing the picture element data output from the extracting means in units of corresponding blocks;

transmission mode determining means for dividing the image information signal composed of a plurality of picture element data corresponding to one picture into the blocks, and determining a transmission mode for the picture element data of which each of the blocks is composed among a plurality of transmission modes having different numbers of picture element data transmitted; reading address generating means for generating a reading address of the first storage means which corresponds to a block determined by the transmission mode determining means to be transmitted in a transmission mode having the greatest number of picture element data transmitted; discrimination data generating means for generating discrimination data for discriminating an address corresponding to an end portion in each horizontal line direction of a picture from other reading addresses generated by the reading address generating means; and picture element data reading means for reading out picture element data stored in the first storage means by using the reading address generated by the reading address generating means and the discrimination data generated by the discrimination data generating means.

Other objects and aspects of the invention will become apparent from the following description of embodiments with reference to the accompanying drawings.

DETAILED DESCRIPTION OF THE PREFERRED EMBODIMENTS

An embodiment of the present invention will now be described with reference to the drawings. The image information signal used in this embodiment is a signal obtained by component-demodulating a TV signal of an NTSC system and time-division multiplexing this TV signal. Furthermore, a TV picture of one field is divided into a plurality of blocks each of which is composed of 4×4 picture elements.

Figure 1:
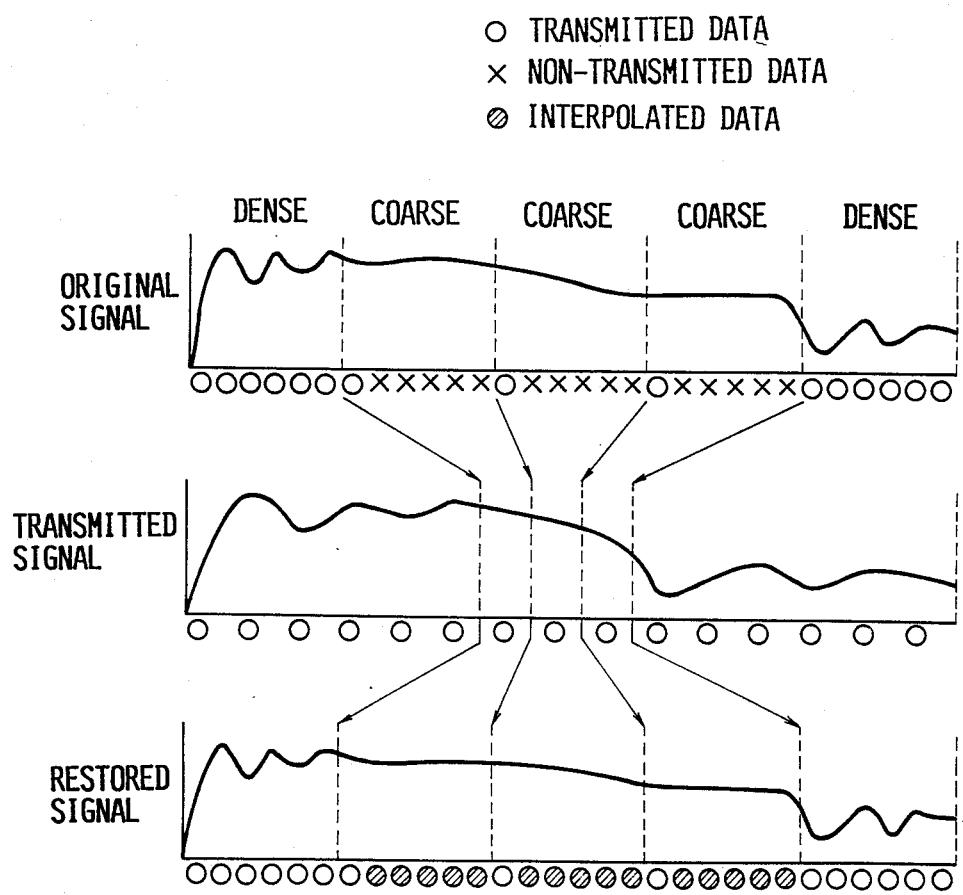
FIG. 1 is a view which illustrates the basic concept of TAT.
Figure 2A:
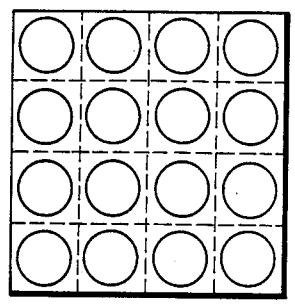
FIGS. 2(a) and 2(b) are views which illustrate data transmission modes in a two dimensional TAT transmitting system.
Figure 2B:
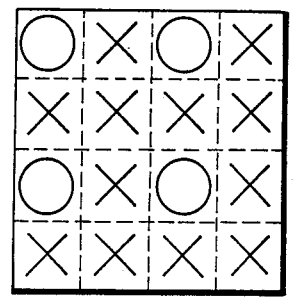
Figure 3:
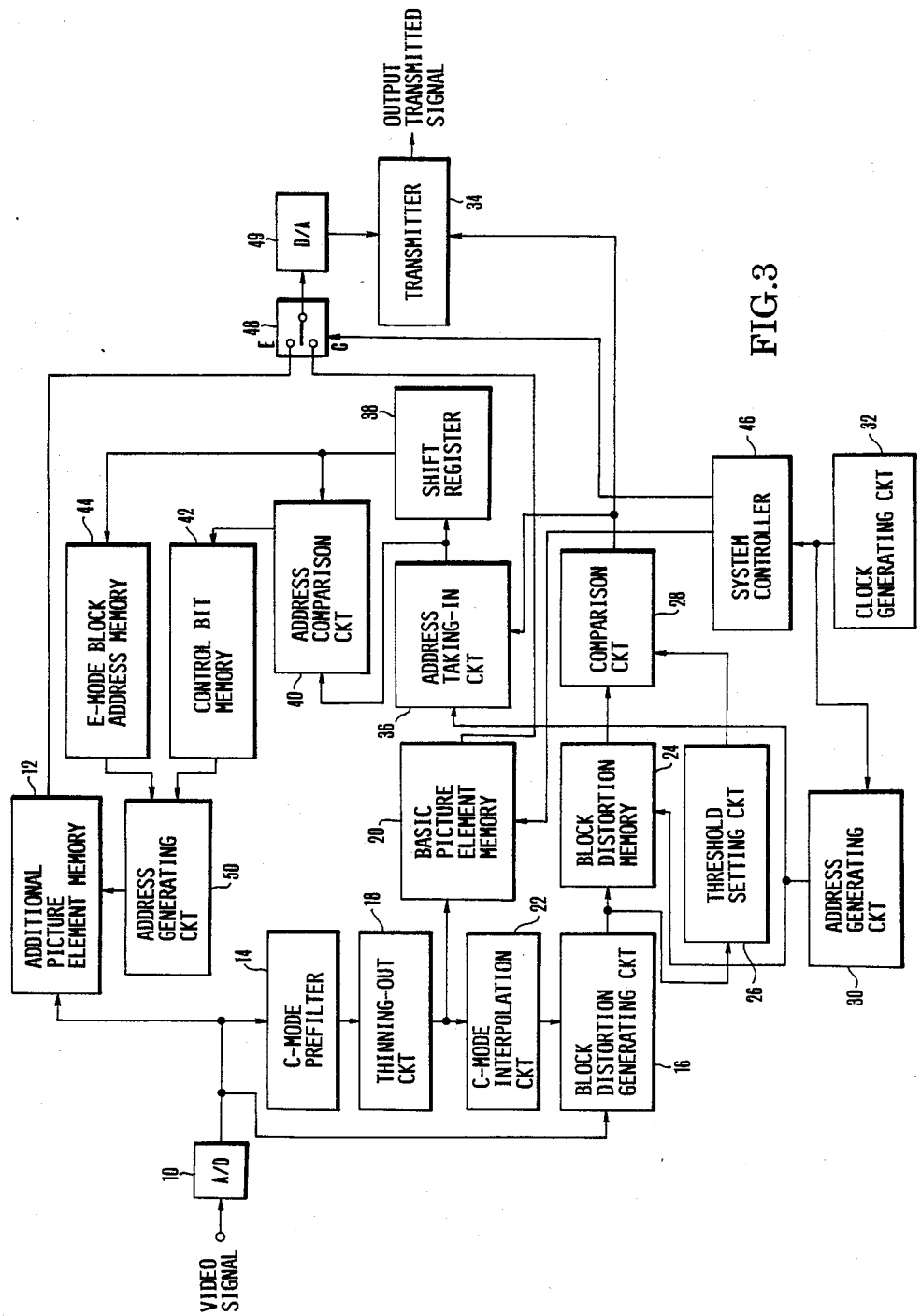
FIG. 3 is a structural block diagram which illustrates the sending system of an embodiment of an image information signal transmitting system.

FIG. 3 is a block diagram which illustrates the structure of a sending system of an image information signal transmitting system according to a first embodiment of the present invention in which an analog transmission passage is employed. An analog image signal which has been supplied to this sending system is converted into a digital signal by an A/D converter 10, and is supplied, as a digital video signal of the mode E, to an additional picture element memory 12, C-mode prefilter 14 and a block distortion generating circuit 16. The additional picture element memory 12 stores the digital video signal of the mode E for a field. The C-mode prefilter 14 comprises a two-dimensional low-pass filter capable of removing a high-frequency component from the E-mode digital video signal. The E-mode signal which has been averaged by the C-mode prefilter 14 is supplied to a thinning-out circuit 18 wherein this signal is thinned out to be a signal for a quarter of picture element data of a block. The output (C-mode signal) of the thinning-out circuit 18 is stored by a basic picture element memory 20, and is also supplied to a C-mode interpolation circuit 22. The C-mode interpolation circuit 22 forms picture element data (the picture elements marked X of FIG. 2(a)) which have been thinned out by the thinning-out circuit 18 by using the picture elements (the picture elements marked O of FIG. 2(b)) to be transmitted in the mode C.

The block distortion generating circuit 16 makes a comparison between the interpolated C-mode signal supplied from the C-mode interpolation circuit 22 and the true value of the corresponding picture element in units of blocks, and outputs information on the thus-obtained difference. A block distortion memory 24 stores the thus-output information on the difference as block distortion information. As for details, see the description which will be given later. The block distortion information memory 24 stores the block distortion for each of the blocks so as to be read out o the basis of the scanning order of the TV signal of the NTSC system or the like. Information on the block distortion generated by the block distortion generating circuit 16 is also supplied to a threshold setting circuit 26. In order to make the period of time taken for transmitting the video signal corresponding to a field uniform, it is necessary to make constant the ratio of the number of picture element blocks to be transmitted in the mode E to the number of picture element blocks to be transmitted in the mode C. The threshold setting circuit 26 sets the threshold of the block distortion serving as a standard for alloting a transmission mode to each of the blocks. For example, assuming that the number o the picture element blocks to be transmitted in the mode C is ⅔ of the total number of the picture element blocks, and assuming that the number of the picture element blocks to be transmitted in the mode E is ⅓ of the same, the total number of data to be transmitted (compression ratio) becomes ½(=⅔×¼+⅓×1). Therefore, the block distortions may be arranged in the order of the higher degree of the absolute value thereof so as to make the value at a position corresponding to the upper ⅓ of that order to be a threshold, so that blocks in which the block distortion is larger than the threshold are transmitted in the mode E, and the blocks in which the block distortion is not larger than the threshold is transmitted in the mode C.

The threshold which has been set by the threshold setting circuit 26 is supplied to a comparison circuit 28. An address generating circuit 30 outputs address signals, to be described later, in synchronization with the clock signals generated by a clock signal generating circuit 32.

Figure 4:
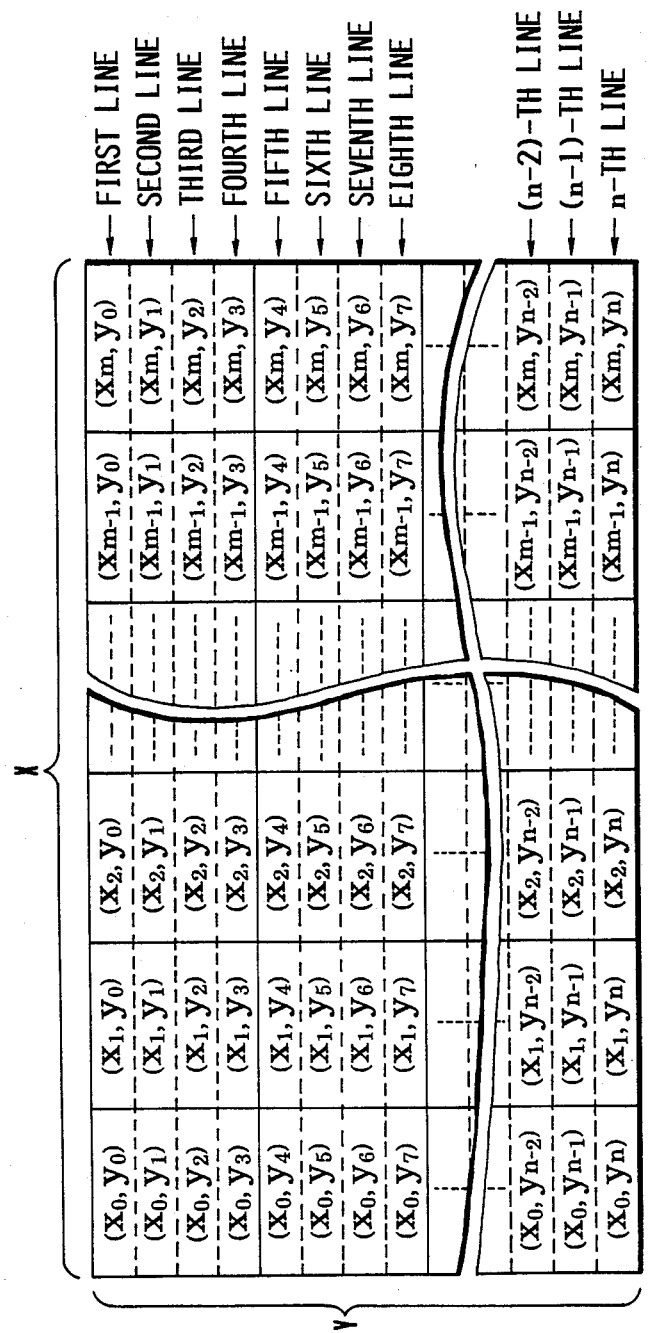
FIG. 4 is a view which illustrates the relationship between the blocks obtained by dividing the picture and the addresses.

FIG. 4 illustrates the relationship between the address signals which are generated by the address generating circuit 30 and the blocks obtained by dividing the picture. It is assumed that an address of each of the blocks in the horizontal direction of the picture is x, while an address of each of the lines in the vertical direction is y. That is, x increments every 4 picture elements, while y increments every horizontal scanning line. The address generating circuit 30 generates address signals on the basis of the sequential number of the lines corresponding to the scanning of the TV signal as $(x_0, y_0), (x_1, y_0), \ldots, (x_n, y_0), (x_0, y_1), \ldots$. The block distortion memory 24 outputs the block distortion of the corresponding block in response to this address signal.

The comparison circuit 28 makes a comparison between the block distortion which has been read out from the block distortion memory 24 and the threshold set by the threshold setting circuit 26. When the block distortion is larger than the threshold, the comparison circuit 28 outputs a mode assigning signal for assigning the mode E. Further, the comparison circuit 28 outputs a mode assigning signal for assigning the mode C when the block distortion is not larger than the threshold. The thus-output mode assigning signal is supplied to a transmitter 34 and an E-mode block address taking-in circuit 36. The address signal generated by the address generating circuit 30 is also supplied to the E-mode block address taking-in circuit 36. Therefore, this E-mode block address taking-in circuit 36 serves as a so-called gate circuit for taking in the address signal and supplying this address signal to a shift register 38 and an address comparison circuit 40 in a case where the mode assigning signal assigns the mode E. The shift register 38 outputs the address signal of the previous block of the mode E each time the address signal is supplied thereto from the address taking-in circuit 36, and simultaneously stores and retains the thus-input address signal of the E-mode block. The address comparison circuit 40 makes a comparison between the previous E-mode block address signal supplied from the shift register 38 and the current E-mode block address signal supplied from the E-mode block address taking-in circuit 36.

Figure 5:
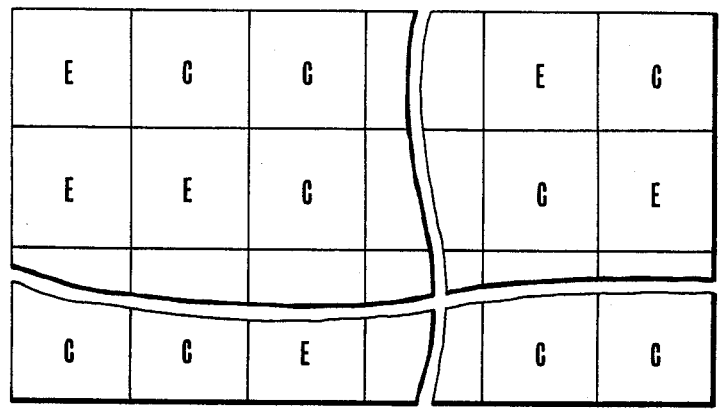
FIG. 5 is a view which illustrates an example of allocation of the transmission modes.
Figure 6:
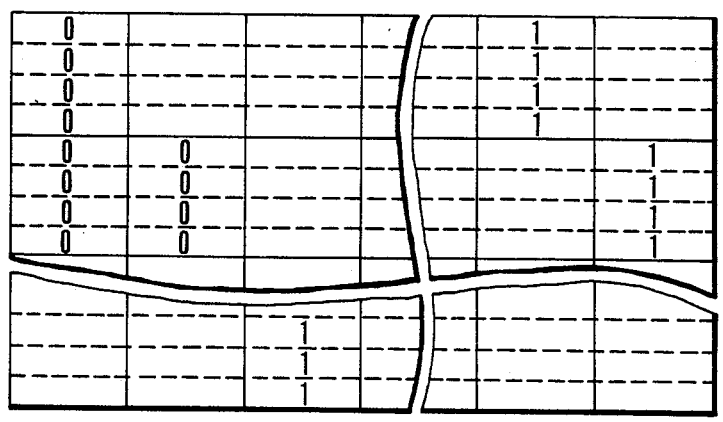
FIG. 6 is view which illustrates control bits.

Assuming that the mode assigning signal output from the comparison circuit 28 is as shown in FIG. 5, $(x_0, y_0)$ and $(x_{m-1}, y_0)$ on the first line of FIG. 4 passes through the E-mode block address taking-in circuit 36 to be supplied to the address comparison circuit 40. The address comparison circuit 40 makes a comparison between two x factors of the corresponding address signals which have been input thereto. If the two x factors are equal to each other, "0" is output, while if they are not equal to each other, "1" is output. That is, the address of the final E-mode block generated in horizontal line units can be detected by the output of the address comparison circuit 40. FIG. 6 is a view which illustrates the output of the address comparison circuit 40 in a case where the picture shown in FIG. 4 is processed in accordance with the mode assignment shown in FIG. 5. The control bits output from the address comparison circuit 40 are stored in a control bit memory 42 by a quantity corresponding to the first one line. The address signals output from the shift register 38 are stored in an E-mode block address memory 44 by a quantity corresponding to the first one line as to correspond to the control bits. This treatment is arranged to be performed every 4 line periods, that is, in the block units in the vertical direction.

Figure 7:
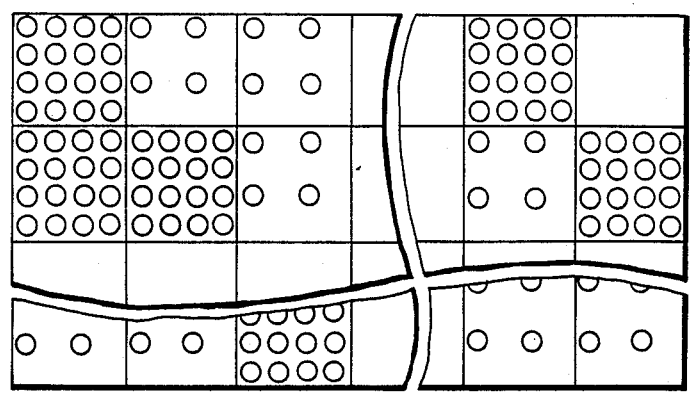
FIG. 7 is a view which illustrates the arrangement of the picture elements to be transmitted on the picture.
Figure 8:
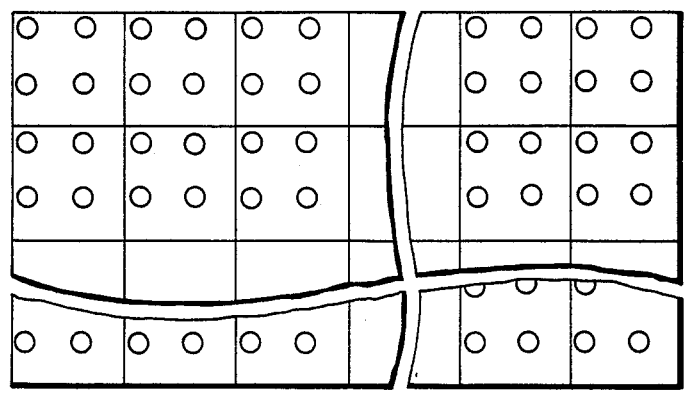
FIG. 8 is a view which illustrates the arrangement of the picture elements to be transmitted in a mode C on the picture.
Figure 9:
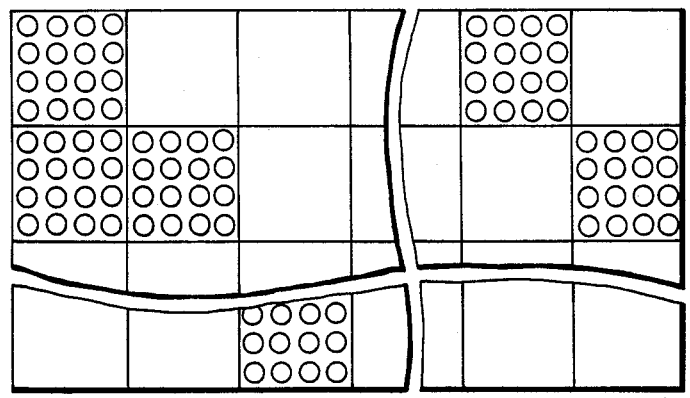
FIG. 9 is a view which illustrates the arrangement of the picture elements to be transmitted in a mode E on the picture.

As described above, the arrangement of the picture elements on the picture to be transmitted in accordance with the mode assignment shown in FIG. 5 becomes as illustrated in FIG. 7. However, according to this embodiment, data on the basic picture elements of all of the blocks corresponding to the mode C is transmitted, and then data on the structural picture elements of the blocks corresponding to the mode E is transmitted. Therefore, data on the picture elements marked O of FIG. 8 is successively transmitted in accordance with the sequential order of the lines, and then the data on the picture elements marked O of FIG. 9 is successively transmitted in accordance with the sequential order of the lines. Since data on the picture elements of FIG. 8 is stored in the basic picture element memory 20 and data on the picture elements of FIG. 9 is stored in the additional picture element memory 12, the thus-stored data is arranged to be read out in the sequential order shown in FIG. 10.

Next, the operation of reading the basic picture element memory 20 and the additional picture element memory 12 will be described. The reading operation of the basic picture element memory 20 is controlled by a system controller 46. The system controller 46 causes C-mode data of each horizontal line corresponding to one field to be output from the memory 20 to a switch 48 successively in 0.5 field period in synchronization with the clock signal supplied thereto from the clock generating circuit 32. Data which has been supplied to the switch 48 is then supplied to a D/A converter 49. The system controller 46 also controls the switching operation of the switch 48 so as to make the switch 48 connected to a contact C in the 0.5 field period during which the memory 20 is being read.

When reading-out of C-mode data from the memory 20 is completed, the switch 48 is switched to a contact E so that data of the blocks to be transmitted in the mode E is read out from the additional picture element memory 12. That is, since the additional picture element memory 12 stores the inputted video signal corresponding to one field, it is necessary to selectively read out data on blocks assigned to the mode E. Since the picture element block according to this embodiment comprises 4×4 picture elements and the signals are transmitted in accordance with the lines corresponding to the TV signal and throughout the blocks, it is necessary to find the block of the horizontal blocks which is to be transmitted in the mode E. According to this embodiment, it can be found by using control bit data of the control bit memory 42.

When the reading of the additional picture element memory 12 starts, the address signal stored in the E-mode block address memory 44 and the control bit data stored in the control bit memory 42 are supplied to an address generating circuit 50. When the control bit data is "0", the reading address signal is supplied to the additional picture element memory 12 so that E-mode data is read out. On the other hand, when data is "1", it is determined that the address signal output from the memory 44 is the address signal of the final E-mode block in the line. Then the reading addresses of the additional picture element memory 12 for three lines are calculated by using the address signal corresponding to this first line, and the reading of the additional picture element memory 12 is successively performed in the horizontal line direction in conforming with the TV signal. The above-described operation is arranged to be repeated every 4 lines. Data read out from the additional picture element memory 12 is supplied to the D/A converter 49 via the switch 48.

Figure 10:
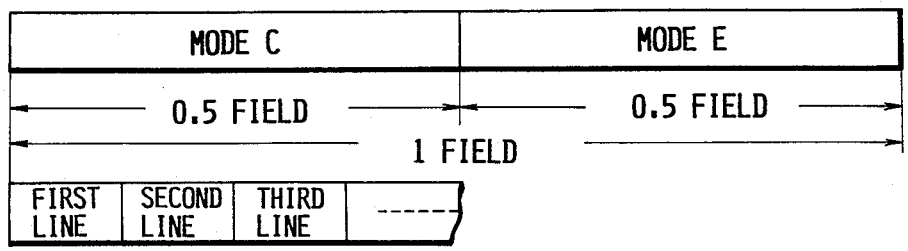
FIG. 10 is a view which illustrates the transmitting order of data to be transmitted from the sending system of the image information signal transmitting system of FIG. 3.

As described above, C-mode data read out from the basic picture element memory 20 and E-mode data read out from the additional picture element memory 12 are, as shown in FIG. 10, supplied to the D/A converter 49 in a time-series manner wherein data is again converted into analog signals to be supplied to the transmitter 34. The transmitter 34 sends out the mode assigning signal output from the comparison circuit 28 to the transmission passage as a mode information signal together with image data output from the D/A converter 49. This operation is arranged to be repeated every one field period.

Since picture element information corresponding to the mode C is collectively transmitted by a quantity for one picture, and detailed E-mode block information is arranged to be next transmitted, a picture with an image quality which at least corresponds to the C-mode transmission can be restored for all of the blocks even if mode information were made erroneous due to interruption on the transmission passage. Furthermore, since each one line is successively transmitted over the blocks in conformity with TV signals, any generation of the affect of the time axis variation such as jitters can be prevented in a partial portion of the picture. In addition, the use of the control bit causes the reading operation from the additional picture element memory 12 to be performed easily, and there is no necessity of provision of a memory for storing the reading addresses for one field. As a result, the structure of the sending system can be simplified.

Figure 11:
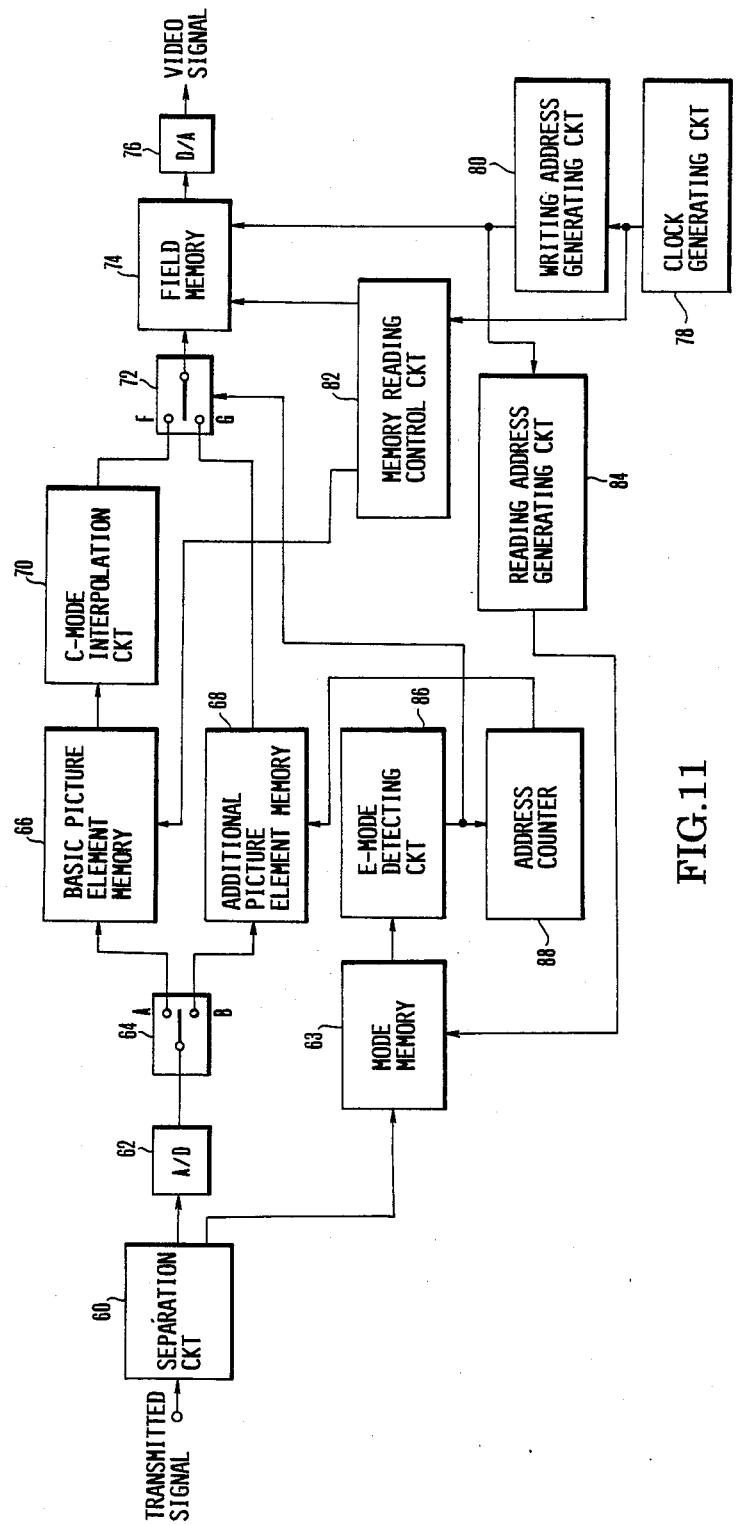
FIG. 11 is a structural block diagram which illustrates a receiving system corresponding to the sending system of the image information signal transmitting system shown in FIG. 3.

FIG. 11 is a block diagram which illustrates the structure of a receiving system corresponding to the sending system of the image information signal transmitting system shown in FIG. 3. The signal transmitted through the transmission passage is separated into an E-mode analog video signal and a mode information signal in a separation circuit 60. The analog video signal is converted into a digital signal by an A/D converter 62, while the mode information signal is stored in a mode memory 63. A switch 64 to be switched every 0.5 field is connected to the side A in the forward 0.5 field, while connected to the side B in the rearward 0.5 field. As a result, C-mode data is stored in a basic picture element memory 66, while the E-mode data is stored in an additional picture element memory 68.

Since it is necessary to synchronize the reading of the mode memory 63 with the writing timing of a field memory 74 for restoring the original image on the basis of transmitted image information, an address generating circuit 84 for generating the reading address of the mode memory 63 generates the required reading address in synchronization with the writing address which is supplied from a writing address generating circuit 80 to a field memory 74. Reference numeral 78 represents a clock generating circuit. An E-mode detecting circuit 86 detects E-mode information from the mode information signal which has been read out from the mode memory 63, and supplies the thus-detected signal to an address counter 88 and a switching control terminal of the switch 72. The address counter 88 increments its count in response to the E-mode detection signals, and the thus-incremented count is supplied, as the reading address, to the additional picture element memory 68. As a result, E-mode data is read out from the additional picture element memory 68, and the thus-read out data is supplied to the switch 72.

On the other hand, a memory reading control circuit 82 generates a reading address signal for the basic picture element memory 66 in response to the clock signal generated by the clock generating circuit 78. As a result, C-mode data is read out from the memory 66 and the thus-read out data is supplied to a C-mode interpolation circuit 70. The C-mode interpolation circuit 70 performs an interpolating treatment of the picture elements which have not been transmitted by using transmitted information, and the thus-interpolated picture elements are supplied to the switch 72.

Since the switch 72 is connected to a point G in the mode E and to a point F in the mode C in response to the detection signal supplied from the E-mode detection circuit 86, all of picture element data is stored in the case of the E-mode transmitted block, and the received basic picture element data and the interpolation data formed from received basic picture element data are stored in the case of the C-mode transmitted block. That is, a restored image for one field is stored in the field memory 74. The memory reading control circuit 82 successively reads out data stored in the memory 74, and the thus-read out data is converted into an analog signal by the D/A converter 76. This operation is arranged to be repeated each field so that an image to be transmitted is restored from the received signal.

As can be clearly understood from the above description, according to this embodiment, the image information signals can be transmitted without any generation of image quality deterioration due to interruption on the transmission passage.

What is claimed is:

1. An image information signal transmitting system comprising:
 (A) first storage means for storing an image information signal composed of a plurality of picture element data corresponding to one picture in units of blocks each of which is composed of a predetermined number of picture element data;
 (B) extracting means for dividing the image information signal composed of a plurality of picture element data corresponding to one picture into the blocks, extracting from each of the blocks a smaller number of picture element data than the number of picture element data of which each of the blocks is composed, and outputting the extracted picture element data;
 (C) second storage means for storing the picture element data output from said extracting means in units of corresponding blocks;
 (D) transmission mode determining means for dividing the image information signal composed of a plurality of picture element data corresponding to one picture into the blocks, and determining a transmission mode for the picture element data of which each of the blocks is composed among a plurality of transmission modes having different numbers of picture element data transmitted;
 (E) reading address generating means for generating a reading address of said first storage means which corresponds to a block determined by said transmission mode determining means to be transmitted in a transmitting mode having the greatest number of picture element data transmitted;

(F) discrimination data generating means for generating discrimination data for discriminating an address corresponding to an end portion in each horizontal line direction of a picture from other reading addresses generated by said reading address generating means; and (G) picture element data reading means for reading out picture element data stored in said first storage means by using the reading address generated by said reading address generating means and discrimination data generated by said discrimination data generating means.

2. An image information signal transmitting system according to claim 1, wherein said picture element data reading means is arranged to obtain reading addresses for several lines by calculating a reading address for the first horizontal line of the several lines which has been supplied when the discrimination data generated by said discrimination data generating means indicates that the reading address generated by said reading address generating means corresponds to an end portion in each horizontal line direction of a picture.

3. An image information signal transmitting system according to claim 1, further comprising control means for controlling a reading operation of picture element data so that picture element data stored in said first storage means is read out by said picture element data reading means after picture element data stored in said second storage means has been read out and transmitted.

* * * * *